United States Patent Office 3,492,350
Patented Jan. 27, 1970

3,492,350
PRODUCTION OF CYCLOHEXANONE OXIME
Vernon V. Young, Terre Haute, Ind., assignor to Commercial Solvents Corporation, New York, N.Y., a corporation of Maryland
No Drawing. Filed Aug. 8, 1966, Ser. No. 570,694
Int. Cl. C07c 131/04
U.S. Cl. 260—566                                    7 Claims

ABSTRACT OF THE DISCLOSURE

An improved process for the production of cyclohexanone oxime by the catalytic reduction of nitrocyclohexane wherein contact of hydrogen with the reaction mixture is discontinued when from about 80 mole percent to 99 mole percent of the nitrocyclohexane has been reduced and the reaction mixture is maintained at reaction conditions for a period of time sufficient to increase the production of cyclohexanone oxime.

---

This invention relates to the production of cyclohexanone oxime. In a particular aspect it relates to an improved process for the production of cyclohexanone oxime by the reduction of nitrocyclohexane by hydrogenation.

Cyclohexanone oxime is an intermediate used in the preparation of caprolactam. In general, it is prepared by the reduction of nitrocyclohexane in the presence of a suitable reduction catalyst. Satisfactory processes are described in U.S. Patents 2,711,427; 2,768,206; 2,886,596 and 3,160,663. Generally, these procedures consist of catalytically hydrogenating nitrocyclohexane under elevated pressures and at a temperature ranging from about 50 to about 150° C. in the presence of an inert organic solvent, such as the lower aliphatic alcohols. In these processes, however, conversion of nitrocyclohexane to cyclohexanone oxime is incomplete. In addition to cyclohexanone oxime and unreacted nitrocyclohexane, major amounts of cyclohexylamine, cyclohexylhydroxylamine, and minor amounts of other impurities such as cyclohexanone are produced.

Various attempts have been made by previous workers to increase the yield of the oxime and minimize the conversion to by-products. According to the process of Runge, U.S. Patent 3,160,663, the nitrocyclohexane is reduced catalytically and the reaction product is further treated in a separate step by blanketing it with an inert gas, such as nitrogen, and then heating in the presence of the catalyst to a temperature of 125–175° C. for ½ hour to 24 hours to produce additional cyclohexanone oxime and thereby reduce the amount of cyclohexylhydroxylamine in the reaction mixture.

Although the prior process is satisfactory for the production of cyclohexanone oxime, the blanketing step and maintaining an inventory of inert gas tend to increase costs. Another disadvantage is that the cyclohexylhydroxylamine which is formed tends to be converted to cyclohexylamine instead of being converted to the oxime, thereby lowering the yield of the oxime. Furthermore, the catalyst is expensive to prepare and use and the oxime produced thereby has been found difficult to purify to make it satisfactory for the preparation of caprolactam.

It is an object of this invention to provide a process for the production of cyclohexanone oxime.

It is another object of this invention to provide an improved process for the production of cyclohexanone oxime by the catalytic reduction of nitrocyclohexane by hydrogenation.

Other objects of this invention will be obvious to those skilled in the art from the description of this invention.

A new process has been discovered for the production of cyclohexanone oxime by the catalytic hydrogenation of nitrocyclohexane. According to the new process, a reaction mixture of nitrocyclohexane, a solvent therefor, and a reduction catalyst is contacted with hydrogen under reducing conditions of temperature and pressure until at least more than 1 mole percent of unreacted nitrocyclohexane remains in the reaction mixture. Hydrogen contact is then discontinued and the reaction mixture is maintained substantially free from contact with hydrogen at approximately the reaction conditions of temperature and pressure for a period of time sufficient to effect increased production of cyclohexanone oxime. When the reaction is substantially complete, the cyclohexanone oxime is recovered from the reaction mixture.

Many of the problems previously encountered can be avoided by the use of the new process. The new process has the advantages of providing cyclohexanone oxime of superior quality for the preparation of caprolactam, improving the conversion of cyclohexylhydroxylamine to cyclohexanone oxime, and minimizing the amount of unreacted nitrocyclohexane in the reaction mixture.

Generally, the present invention is a high temperature process using a lower aliphatic alcohol, e.g., methanol, as a solvent, a reduction catalyst, preferably silver chromate or silver dichromate precipitated onto a support, such as calcium carbonate or zinc oxide and hydrogen as the reducing agent. The process comprises reducing about 80 to 99 mole percent, preferably about 85 to about 98 mole percent and 85 to about 97 mole percent is particularly preferred, of the nitrocyclohexane in the presence of hydrogen, then substantially discontinuing hydrogen contact, and holding the reaction mixture at approximately the reduction temperature to effect increased conversion of cyclohexylhydroxylamine and residual nitrocyclohexane to cyclohexanone oxime and thereby increase the amount of cyclohexanone oxime produced. Thus hydrogen is advantageously discontinued when from about 20 to about 1 mole percent of nitrocyclohexane remains in the reaction mixture, although 15 to 1 mole percent, preferably 3–5 mole percent, generally produces the best results.

Several possible reactions can occur during the reduction step. They can be represented, non-stoichiometrically, as follows (R=cyclohexyl):

(1)    $RNO_2 + H_2 \rightarrow RNOH + RNHOH + RNH_2$ (2)    $RNHOH + RNO_2 \rightarrow 2RNOH$ (3)    $RNHOH + H_2 \rightarrow RNH_2$ (4)    $2RNHOH \rightarrow RNOH + RNH_2$ Equation 1 represents the predominant reactions and products thereof during the hydrogenation step. The principal reaction product is the oxime, RNOH, but cyclohexylhydroxylamine and cyclohexylamine are produced simultaneously in relatively lesser amounts. If contact with hydrogen continues as the nitrocyclohexane concentration approaches extinction, the cyclohexylhydroxylamine is reduced to cyclohexylamine (Equation 3) instead of being converted to the oxime (Equation 2) thus leading to low yield of oxime. However, it is the discovery of this invention that conversion of the hydroxylamine to the amine (3) is minimized when contact of hydrogen with the reaction mixture is discontinued as the reduction of nitrocyclohexane nears completion. In the absence of hydrogen contact, the reaction of Equation 2 proceeds so that the hydroxylamine is converted to the oxime instead of to the amine via the reactions of Equation 3 and 4. Discontinuing hydrogen contact allows a residue of nitrocyclohexane which is necessary for the conversion of the hydroxylamine to the oxime, Equation 2, and thereby minimizes the reaction of Equation 4 which is undesirable because of the formation of cyclohexylamine.

In the practice of this invention, a reactor equipped with an agitation means, a sampling means, a heating means and a cooling means, is purged with hydrogen to eliminate oxygen. Hydrogen is then introduced until a pressure of 400–500 p.s.i.g. is reached. The catalyst is mixed with the methanol, and this mixture and about an equivalent weight of nitrocyclohexane are concurrently introduced into the reactor, preferably, but not necessarily, as separate streams. Sufficient hydrogen is vented from the reactor to maintain a pressure of 400–500 p.s.i.g. as the reactants are introduced. When delivery of the reactants to the reactor is complete, the reactor is sealed and agitation is commenced. The temperature is then rapidly raised to about 170° C. and the pressure is raised to about 600 p.s.i.g. by adding hydrogen. The heating is continued until the temperature reaches about 178° C.–180° C. At about this temperature the exothermic reaction becomes sufficiently rapid that some cooling may be necessary. In general, it has been found advantageous to conduct the reaction at a temperature of about 175° C. to about 190° C. and preferably at about 180° C. to about 185° C. At temperatures below about 180°–185° C. the reaction tends to desirably reduce the amount of cyclohexanone produced but undesirably reduces the rate of disappearance of cyclohexylhydroxylamine. At temperatures above about 180–185° C., the tendency is reversed, so that cyclohexylhydroxylamine disappears at a more desirable rate, but the amount of cyclohexanone produced is undesirably high.

During the reaction period the pressure is maintained at from about 600 p.s.i. to about 1000 p.s.i.g., preferably about 600 to 700 p.s.i.g. There is some variability in the activities of different lots of catalysts and when it is observed that the reaction tends to be slow, higher pressure is employed.

The reaction rate is monitored by determining the nitrocyclohexane content periodically, e.g. at 5 to 10 minute intervals, during the reaction period. Suitable samples are taken from the sampling means and the nitrocyclohexane concentration is determined by any satisfactory procedure known to the art. By plotting nitrocyclohexane concentration (usually as weight percent of the mixture) as a function of time, a generally straight line is obtained and by extrapolation, it can be forecast at which time 80 to 99 mole percent of the nitrocyclohexane will have reacted. Preferably, the reaction is continued until from 95 to 97 mole percent has reacted. Hydrogen contact is then substantially discontinued by shutting off the hydrogen supply and stopping agitation. Contact of hydrogen in the headspace with the reaction mixture at the gas-liquid interface is negligible after agitation is stopped.

By monitoring the rate of reaction it can be observed if the reaction rate is below that desired, and, if so, higher pressures are employed to compensate for catalyst inactivity. In general, reaction times of approximately 90 minutes to about 150 minutes are satisfactory and a reaction time of about 110 minutes to about 130 minutes is preferred. Reaction times less than 90 minutes are not per se objectionable, but because of the time lag in analyzing samples and the rapid reaction rate, it becomes difficult to forecast the time at which the hydrogen supply and agitation are to be shut off. Premature hydrogen shut off leads to excessive residual unreacted nitrocyclohexane and tardy shut off leads to inadequate residual nitrocyclohexane, which in turn leads to undesirable production of cyclohexylamine, as has been previously described.

After the hydrogen supply is shut off and agitation is stopped, i.e. after hydrogen contact has been substantially discontinued, the reaction mixture is allowed to stand undisturbed at approximately the reaction temperature for a period of time sufficient to allow the desirable side reactions to go to completion, as previously described. Preferably the temperature of the reaction mixture is cooled slightly to from about 175° C. to about 180° C.

The time interval, during which the reaction mixture is allowed to stand undisturbed, can vary from about 10 minutes to about 60 minutes, preferably from about 20 minutes to about 40 minutes. On a production basis a period of 30 minutes is satisfactory. Data are given in Table 1 showing the change in composition of the reaction mixture as it stands undisturbed. In Table 2, data are given showing the change in composition while the mixture is agitated with hydrogen in the headspace but after the hydrogen flow is shut off. The agitation provides continuing contact with hydrogen.

TABLE 1.—CHANGE IN COMPOSITION, MOLE PERCENT, AS REACTION MIXTURE STANDS UNDISTURBED AFTER HYDROGEN SHUT-OFF

| Run No. | 78 | | | | 87 | | | | 88 | | | | 89 | | | |
|---|---|---|---|---|---|---|---|---|---|---|---|---|---|---|---|---|
| Temperature, max. (° C.) | 190 | | | | 186 | | | | 179 | | | | 186 | | | |
| Catalyst,* percent | 1 | | | | 0.5 | | | | 0.25 | | | | 0.5 | | | |
| Pressure, p.s.i.g. | 1,000 | | | | 600 | | | | 1,000 | | | | 600 | | | |
| Time from H₂ off, (min.) | 0 | 20 | 40 | 60 | 0 | 20 | 40 | 60 | 0 | 20 | 40 | 60 | 0 | 20 | 40 | 60 |
| Cyclohexylamine, percent | 5.6 | 9.9 | 10.5 | 13.2 | 2.0 | 3.2 | 2.9 | 5.1 | 12.5 | 14.1 | 14.4 | 14.7 | 3.2 | 4.5 | 4.1 | 4.6 |
| Cyclohexylhydroxylamine, percent | 10.9 | 5.8 | 1.7 | | 5.8 | 1.9 | 1.9 | 1.7 | 7.6 | 4.5 | 3.8 | 4.0 | 4.0 | 1.2 | | |
| Cyclohexanone oxime, percent | 75.0 | 80.9 | 84.5 | 83.4 | 78.3 | 86.8 | 88.1 | 89.9 | 73.4 | 77.1 | 78.1 | 76.6 | 79.3 | 85.4 | 86.7 | 87.7 |
| Nitrocyclohexane, percent | 7.6 | 1.6 | | | 11.5 | 5.4 | 4.0 | 2.7 | 4.6 | 3.2 | 2.1 | 2.1 | 10.2 | 6.3 | 5.4 | 4.8 |
| Cyclohexanone, percent | 0.9 | 1.7 | 3.2 | 3.4 | 2.5 | 2.8 | 3.2 | 1.2 | 2.0 | 1.1 | 1.5 | 2.5 | 3.4 | 2.7 | 3.9 | 3.0 |

* By weight of nitrocyclohexane charge.

TABLE 2.—CHANGE IN COMPOSITION, MOLE PERCENT, AS REACTION MIXTURE IS AGITATED AFTER HYDROGEN SHUT-OFF

| Run No. | 65 | | 73 | | 66 | | 71 | |
|---|---|---|---|---|---|---|---|---|
| Pressure, p.s.i.g. | 1,000 | | 700 | | 1,000 | | 700 | |
| Temperature, max. (° C.) | 192 | | 182 | | 180 | | 178 | |
| Catalyst,* percent | 1 | | 1 | | 1 | | 1 | |
| Time from H₂ off, (min.) | 0 | 30 | 0 | 30 | 0 | 60 | 0 | 60 |
| Cyclohexylamine, percent | 8.5 | 14.9 | 5.4 | 16.3 | 2.8 | 14.4 | 2.8 | 21.2 |
| Cyclohexylhydroxylamine, percent | 9.8 | 5.9 | 5.4 | | 7.1 | 2.0 | 5.1 | |
| Cyclohexanone oxime, percent | 47.7 | 78.0 | 79.8 | 79.3 | 55.3 | 77.7 | 81.9 | 73.2 |
| Nitrocyclohexane | 34.0 | | 7.4 | | 34.8 | | 7.1 | |
| Cyclohexanone | | 1.1 | 2.0 | 4.7 | | 6.1 | 3.3 | 5.6 |

*By weight of nitrocyclohexane charge.

It has been found advantageous to conduct the reaction in a column-type reactor. The hydrogen is introduced into the reaction mixture at the bottom of the reactor and unreacted hydrogen collects in the headspace. When sufficient nitrocyclohexane has reacted that further contact with hydrogen is undesirable, such contact can be limited to the liquid-vapor interface at the top of the reactor which, because of the columnar design, is negligible compared with the total volume.

Stainless steel is the preferred material of construction because ordinary steel catalyzes the reaction and accelerates it by a factor of 2 to 4 thus making the reaction difficult to control. In addition, the use of ordinary steel in the presence of the catalyst gives a highly colored product. After the catalyst has been separated from the reaction product, the latter can be stored in ordinary steel without difficulty.

The nitrocyclohexane, hydrogen, and alcohol solvent employed in the practice of this invention are articles of commerce and ordinary commercial grade materials are satisfactory provided they contain no impurities which would adversely affect the catalyst or final product quality. Methanol is the preferred solvent for reasons of economy.

The amount of catalyst employed can vary from about 0.1% to about 5% based on the weight of the nitrocyclohexane but at catalyst levels below 0.1%, the reaction time is uneconomically prolonged and above 5% the reaction rate is so rapid that the process is difficult to control. In general, a catalyst level of from about 0.2 to about 1.0% gives the best results and about 0.5% is preferred.

Any suitable reduction catalyst which will reduce nitrocyclohexane such as the ones described in the previously cited patents can be utilized. However, the catalyst described in U.S. Patent 3,267,142 is preferred. It is prepared as follows:

PREPARATION OF CATALYST

The catalyst employed in the practice of this invention can be silver chromate or silver dichromate per se or either may be employed in combination with a suitable support such as zinc oxide, calcium carbonate, alumina, silica, calcium oxide, calcium phosphates, titanium oxide, and charcoal. In general, zinc oxide is the preferred support.

The supported silver chromate or silver dichromate catalyst can be prepared as follows:

An aqueous slurry of the support and silver nitrate is formed and the slurry mixed with an aqueous medium containing a source of chromate or dichromate ion to precipitate the catalyst as a solid. The solid precipitate is then separated from the aqueous medium by filtration and dried at a temperature from about 50 to 110° C. to obtain the active catalyst. In an alternate procedure, a slurry of chromate or dichromate ions and the support can be formed and the silver nitrate then added to the slurry. Any water soluble source of chromate or dichromate ions can be utilized in preparing the catalyst of the invention. Such suitable sources include ammonium dichromate, calcium dichromate, sodium dichromate, potassium dichromate, chromic acid, ammonium chromate, calcium chromate, sodium chromate, potassium chromate and the like.

Although the final percentages of support and silver chromate or dichromate are not critical when a combination catalyst is used, generally from about 10 to 90 weight percent of the chromate can be used and the preferred catalyst contains equal amounts by weight of support and silver chromate or silver dichromate.

The following examples serve to illustrate the process. It is not intended however that this invention be limited to the exact procedures, or specific apparatus, set forth therein. It is intended to include all equivalents obvious to the art.

Example 1

Nitrocyclohexane, 80 lb., was charged to the nitrocyclohexane feed tank. Methanol, 80 lb., containing about 4 lb. (0.5%) silver dichromate catalyst was charged to the methanol feed tank. An air-motor agitator was employed in the tank to maintain the catalyst in suspension. The reactor was purged with hydrogen to eliminate oxygen and the reactor was then pressurized to 400–500 p.s.i.g. with hydrogen. The nitrocyclohexane and the methanol-catalyst mixture were concurrently pumped into the reactor, venting hydrogen as necessary to maintain 400–500 p.s.i.g. pressure, but the venting was stopped after half of the reactant charge had been pumped into the reactor.

The reactants were heated rapidly to about 170° C. and the pressure was raised to about 600 p.s.i.g. with added hydrogen. Heating was continued to raise the temperature to 178–180° C. at which temperature the reaction became exothermic. The temperature was maintained between 180–185° C. by heating or cooling, as necessary.

Samples of the reaction mixture were taken every 10 minutes from a side arm of the reactor and were analyzed for nitrocyclohexane content. By plotting percent nitrocyclohexane vs. time, a generally straight line was obtained and by extrapolation it was predicted that about 98% by weight of the total nitrocyclohexane would have been consumed after 90 minutes reaction period. Accordingly, after 87 minutes the hydrogen supply was shut off and agitation was stopped. Analysis showed 2% by weight (4.2 mole percent) of the nitrocyclohexane remaining in the reaction mixture and the cyclohexylhydroxylamine content was 5.2 mole percent.

The temperature of the reaction mixture was 178° C. and the mixture was allowed to stand undisturbed for 45 minutes at the end of which time the cyclohexylhydroxylamine content was 0.7%. The reaction mixture was then cooled to 40° C., the contents were withdrawn, and the catalyst was filtered off. The mixture analyzed as follows (corrected for methanol content):

TABLE 3.—COMPOSITION, MOLE PERCENT, OF REACTION MIXTURE

| Run No. 100 | At H$_2$ shut-off, percent | After 45 min., percent |
|---|---|---|
| Cyclohexylamine | 2.7 | 6.1 |
| Cyclohexylhydroxylamine | 5.2 | 0.7 |
| Cyclohexanone oxime | 85.7 | 87.9 |
| Nitrocyclohexane | 4.2 | |
| Cyclohexanone | 2.2 | 5.3 |

From this mixture, cyclohexanone oxime was recovered. It was suitable for caprolactam production without further treatment.

Example 2

The experiment of Example 1 was repeated except that the reaction mixture was allowed to stand only 30 minutes. The following results were obtained:

| Run No. 97 | After H$_2$ shut-off, percent | After 30 min., percent |
|---|---|---|
| Cyclohexylamine | 3.4 | 4.9 |
| Cyclohexylhydroxylamine | 5.3 | 2.9 |
| Cyclohexanone oxime | 84.2 | 87.7 |
| Nitrocyclohexane | 3.4 | 0.2 |
| Cyclohexanone | 3.8 | 4.4 |

From this mixture, cyclohexanone oxime was recovered. It was suitable for caprolactam production without further treatment.

Example 3

The procedure of Example 1 was repeated 20 times except that for 10 of these, agitation was continued for the 30 minute period following hydrogen shut-off, thus allowing hydrogen in the headspace to be continually exposed to increments of the reaction mixture. The following results were obtained.

| | Agitated, mole percent | Not Agitated, mole percent |
|---|---|---|
| Cyclohexylamine produced | 9–25 | 3–5 |
| Cyclohexanone produced | 5–13 | 3–8 |

These collective results clearly show the importance of eliminating hydrogen contact in the final portion of the reaction period.

Examples 4–31

The general procedure of Example 1 was repeated and the yield distribution was measured periodically from the time of hydrogen and agitation shut off. The catalyst level was 0.5% by weight of nitrocyclohexane, except as noted otherwise. The pressure in Examples 4–10 was 1000 p.s.i.g. and in Examples 11–31 it was 600 p.s.i.g. except as otherwise noted. The results obtained are given in Table 4. The cyclohexanone oxime produced was recovered and was determined to be suitable for use in caprolactam production.

TABLE 4

| Example No. | Run No. | Holding time after H₂ shut off (min.) | Mole percent | | | | | Max. temp., (°C.) | Remarks |
| --- | --- | --- | --- | --- | --- | --- | --- | --- | --- |
| | | | Cyclohexyl-amine | Cyclohexyl-hydroxyl-amine | Cyclohexa-none oxime | Nitrocyclo-hexane | Cyclo-hexanone | | |
| 4 | 78 | 0 | 5.6 | 10.9 | 75.0 | 7.6 | 0.9 | 190 | 1% catalyst. |
| | | 20 | 9.9 | 5.8 | 80.9 | 1.6 | 1.7 | | |
| | | 40 | 10.5 | 1.7 | 84.5 | | 3.2 | | |
| | | 60 | 13.2 | | 83.4 | | 3.4 | | |
| 5 | 79 | 0 | 5.6 | 11.2 | 53.9 | 29.1 | 0.2 | 190 | 1% catalyst. |
| | | 20 | 8.5 | 2.2 | 70.2 | 18.3 | 0.8 | | |
| | | 40 | 9.3 | 0.7 | 76.6 | 12.4 | 1.1 | | |
| | | 60 | 9.5 | | 80.3 | 8.0 | 2.3 | | |
| 6 | 80 | 0 | 7.3 | | 65.2 | 25.0 | 2.5 | 180 | |
| | | 20 | 7.8 | 0.8 | 65.8 | 23.0 | 2.5 | | |
| | | 40 | 8.0 | | 67.7 | 21.6 | 2.7 | | |
| | | 60 | 8.6 | | 68.1 | 20.5 | 2.9 | | |
| 7 | 81 | 0 | 4.6 | 17.6 | 38.6 | 39.1 | 0 | 186 | |
| | | 20 | 7.5 | 7.7 | 61.1 | 23.7 | 0 | | |
| | | 40 | 8.1 | 4.1 | 65.3 | 22.5 | 0 | | |
| | | 60 | 8.2 | 2.2 | 68.6 | 21.0 | 0 | | |
| 8 | 82 | 0 | 7.1 | 10.9 | 64.9 | 16.4 | 0.4 | 181 | |
| | | 20 | 8.8 | 8.6 | 71.4 | 10.6 | 0.5 | | |
| | | 40 | 10.9 | 5.3 | 75.6 | 7.7 | 0.5 | | |
| | | 60 | 10.5 | 5.2 | 78.1 | 5.2 | 1.0 | | |
| 9 | 83 | 0 | 8.1 | 17.6 | 62.2 | 12.2 | | 198 | |
| | | 20 | 13.7 | 9.5 | 76.4 | 0.4 | | | |
| | | 60 | 16.0 | 5.4 | 78.6 | | | | |
| | | 75 | 17.1 | | 80.0 | | 2.9 | | |
| 10 | 84 | 0 | 7.1 | 22.3 | 54.4 | 16.1 | 0.1 | 188 | |
| | | 30 | 20.6 | 7.2 | 70.4 | 0.9 | 0.9 | | |
| | | 60 | 28.5 | 1.6 | 69.1 | | 0.8 | | |
| 11 | 85 | 0 | 7.0 | 8.5 | 62.9 | 21.6 | | 182 | |
| | | 30 | 7.7 | 1.8 | 77.4 | 13.4 | | | |
| | | 70 | 8.2 | 0.7 | 79.9 | 11.2 | | | |
| | | 90 | 7.2 | | 82.1 | 8.3 | 2.5 | | |
| 12 | 86 | 0 | 5.9 | 9.6 | 71.7 | 12.8 | | 179 | |
| | | 20 | 7.1 | 5.1 | 81.2 | 6.2 | 0.5 | | |
| | | 40 | 8.2 | 4.5 | 83.2 | 3.8 | 0.3 | | |
| | | 60 | 9.2 | 2.0 | 85.3 | 2.6 | | | |
| 13 | 87 | 0 | 2.0 | 5.8 | 78.3 | 11.5 | 2.5 | 186 | 9 |
| | | 40 | 2.9 | 1.9 | 88.1 | 4.0 | 3.2 | | |
| | | 60 | 5.1 | 1.7 | 89.9 | 2.7 | 1.2 | | |
| | | 90 | 5.6 | 1.7 | 90.3 | 1.1 | 1.4 | | |
| 14 | 88 | 0 | 12.5 | 7.6 | 73.4 | 4.6 | 2.0 | 179 | |
| | | 40 | 14.4 | 3.8 | 78.1 | 2.1 | 1.5 | | |
| | | 60 | 14.7 | 4.0 | 76.6 | 2.1 | 2.5 | | |
| | | 90 | 14.0 | 4.3 | 75.3 | 3.0 | 3.3 | | |
| 15 | 89 | 0 | 3.2 | 4.0 | 79.3 | 10.2 | 3.4 | 186 | |
| | | 20 | 4.5 | 1.2 | 85.4 | 6.3 | 2.7 | | |
| | | 40 | 4.1 | | 86.7 | 5.4 | 3.9 | | |
| | | 60 | 4.6 | | 87.7 | 4.8 | 3.0 | | |
| 16 | 93 | 10 | 8.5 | 4.1 | 85.8 | | 1.7 | 184 | |
| | | 30 | 9.8 | 1.7 | 86.9 | 0.1 | 1.5 | | |
| 17 | 96 | 0 | 5.3 | 6.3 | 77.5 | 9.1 | 2.0 | 183 | |
| | | 30 | 7.0 | 2.0 | 84.6 | 3.2 | 2.2 | | |
| 18 | 98 | 0 | 5.1 | 3.1 | 81.5 | 9.7 | 0.6 | 181 | |
| | | 45 | 8.8 | | 90.1 | 1.0 | | | |
| 19 | 99 | 0 | 3.6 | 2.7 | 81.9 | 9.8 | 2.0 | 182 | |
| | | 45 | 5.3 | | 87.7 | 4.1 | 2.9 | | |
| 20 | 101 | 0 | 2.7 | 2.5 | 85.0 | 6.3 | 3.5 | 183 | Pressure, 600-700 p.s.i.g. |
| | | 45 | 5.0 | | 88.7 | 2.2 | 4.1 | | |
| 21 | 102 | 0 | 4.2 | 3.5 | 85.9 | 3.4 | 3.0 | 182 | Pressure, 600-800 p.s.i.g. |
| | | 45 | 7.1 | 1.0 | 88.0 | 0.3 | 3.6 | 182 | |
| 22 | 103 | 0 | 4.0 | 3.2 | 83.7 | 6.2 | 3.0 | 181 | |
| | | 45 | 5.1 | | 87.8 | 2.1 | 4.9 | | |
| 23 | 104 | 0 | 3.7 | 3.1 | 86.9 | 2.7 | 3.6 | 180 | |
| | | 45 | 5.0 | 1.0 | 88.2 | 0.2 | 5.7 | | |
| 24 | 105 | 0 | 4.1 | 2.9 | 85.5 | 3.8 | 3.7 | 181 | |
| | | 45 | 7.3 | 1.1 | 87.8 | 0.8 | 0.1 | | |
| 25 | 106 | 0 | 4.3 | 11.1 | 72.7 | 10.1 | 1.9 | 179 | Pressure, 1,000 p.s.i.g. |
| | | 20 | 10.5 | 2.8 | 84.2 | | 4.3 | | |
| 26 | 107 | 0 | 5.7 | 9.6 | 81.4 | 1.0 | 2.3 | 187 | Pressure, 800 p.s.i.g. |
| | | 45 | 9.6 | 3.9 | 81.7 | | 4.8 | | |
| 27 | 108 | 0 | 5.9 | 7.7 | 76.5 | 7.9 | 1.9 | 178 | |
| | | 45 | 8.0 | 3.5 | 82.3 | 3.2 | 3.1 | | |
| 28 | 109 | 0 | 5.7 | 5.7 | 80.0 | 6.8 | 1.9 | 180 | Pressure, 600-800 p.s.i.g. |
| | | 60 | 8.1 | 2.7 | 84.1 | 2.4 | 2.7 | | |
| 29 | 110 | 0 | 4.9 | 5.4 | 81.2 | 5.8 | 2.7 | 179 | Do. |
| | | 60 | 7.7 | 2.4 | 84.8 | 1.4 | 3.7 | | |
| 30 | 111 | 0 | 5.8 | 3.5 | 83.8 | 4.3 | 2.7 | 172 | Do. |
| | | 60 | 7.9 | 2.7 | 85.2 | 1.4 | 2.9 | | |
| 31 | 112 | 0 | 7.0 | 15.6 | 75.8 | | 1.7 | 174 | Pressure, 1,000 p.s.i.g. |
| | | 60 | 15.5 | 5.0 | 76.3 | | 3.2 | | |

What is claimed is:

1. A continuous, one-step process for the production of cyclohexanone oxime by the catalytic hydrogenation of nitrocyclohexane comprising:

(a) contacting with hydrogen a reaction mixture consisting of nitrocyclohexane, an inert solvent therefor, and a reduction catalyst capable of reducing nitrocyclohexane under reducing conditions at a temperature of 175–190° C. and pressure of 600–1000 p.s.i.g. until about 20 to about 1 mole percent of unreacted nitrocyclohexane remains in the reaction mixture, (b) discontinuing agitation and hydrogen supply thereby substantially discontinuing contact of the said reaction mixture with said hydrogen, while (c) continuously maintaining said reaction mixture substantially free from contact with said hydrogen at said conditioins of temperautre and pressure for a period of time sufficient to effect increased production of cyclohexanone oxime, and (d) recovering said cyclohexanone oxime from said reaction mixture.

2. A continuous, one-step process for the production of cyclohexanone oxime by the catalytic hydrogenation of the nitrocyclohexane comprising:

(a) heating with agitation a reaction mixture consisting of nitrocyclohexane, a lower aliphatic alcohol and a reduction catalyst capable of reducing nitrocyclohexane while said reaction mixture is maintained in intimate contact with hydrogen under reducing conditions at a temperature of 175–190° C. and pressure of 600–1000 p.s.i.g. until about 20 mole percent to about 1 mole percent of the nitrocyclohexane remains in the reaction mixture, (b) discontinuing agitation and hydrogen supply thereby substantially discontinuing contact of the said reaction mixture with said hydrogen, and (c) continuously maintaining said reaction mixture substantially free from contact with said hydrogen at a temperature of from about 175° C. to about 190° C. to effect increased production of said cyclohexanone oxime whereby the amount of nitrocyclohexane remaining in said reaction mixture is diminished, and (d) recovering said cyclohexanone oxime from the said reaction mixture.

3. The process of claim 2 wherein the reducing temperature is from about 180° C. to about 185° C., the pressure is from about 600 p.s.i.g. to about 1000 p.s.i.g. and the reaction mixture is continuously maintained substantially free from contact with hydrogen for a period of time of from about 10 minutes to about 60 minutes.

4. The process of claim 2 wherein contact of the reaction mixture with hydrogen is substantially discontinued when from about 15 mole percent to about 1 mole percent remains in said reaction mixture.

5. In a continuous, one-step process for the production of cyclohexanone oxime by the catalytic reduction of nitrocyclohexane in the presence of hydrogen under reaction conditions at a temperature of 175–190° C. and pressure of 600–1000 p.s.i.g. sufficient to effect reduction of the nitrocyclohexane and to yield a reaction mixture, the step comprising discontinuing agitation and hydrogen supply thereby substantially discontinuing contact of hydrogen with said reaction mixture when from about 80 mole percent to not more than 99 mole percent of said nitrocyclohexane has been reduced, and continuously maintaining said reaction mixture at substantially said reaction conditions of temperature and pressure for a period of time sufficient to effect an increased production of said cyclohexanone oxime, and recovering said cyclohexanone oxime.

6. The process of claim 5 wherein contact with hydrogen is discontinued when from about 85 to about 98 mole percent of the nitrocyclohexane has been reduced.

7. The process of claim 5 wherein contact with hydrogen is discontinued when from about 95 to about 97 mole percent of nitrocyclohexane has been reduced.

References Cited

UNITED STATES PATENTS

| 1,712,709 | 5/1929 | Lommel et al. | 260—563 |
| 3,376,341 | 4/1968 | Bauer | 260—563 |
| 3,160,663 | 12/1964 | Runge | 260—566 |

FOREIGN PATENTS

| 712,192 | 6/1965 | Canada. |

BERNARD HELFIN, Primary Examiner

GERALD A. SCHWARTZ, Assistant Examiner

UNITED STATES PATENT OFFICE
CERTIFICATE OF CORRECTION

Patent No. 3,492,350   Dated January 27, 1970

Inventor(s) Vernon V. Young

It is certified that error appears in the above-identified patent and that said Letters Patent are hereby corrected as shown below:

Column 2, line 30, "85 to about 97 mole percent" should read -- 95 to about 97 mole percent --; line 69, "Equation" should read -- Equations --. Column 3, line 33 "psi" should read -- psig --. Column 6, line 58, Example 3 "3-5" should read -- 3-8 --; line 59, Example 3 "3-8" should read -- 3-5 --; Column 7, Table 4, after Example 13, cancel "9". Column 8, line 63, claim 1, (c), "conditioins" should read -- conditions --; line 63, claim 1, (c), "temperautre" should read -- temperature --.

Signed and sealed this 29th day of September 1970.

(SEAL)
Attest:

EDWARD M. FLETCHER, JR.
Attesting Officer

WILLIAM E. SCHUYLER, JR.
Commissioner of Patents